(12) United States Patent
Zhu et al.

(10) Patent No.: US 12,078,901 B2
(45) Date of Patent: Sep. 3, 2024

(54) DISPLAY PANEL AND DISPLAY PANEL MANUFACTURING METHOD

(71) Applicant: TCL CHINA STAR OPTOELECTRONICS TECHNOLOGY CO., LTD., Guangdong (CN)

(72) Inventors: Maoxia Zhu, Guangdong (CN); Hongyuan Xu, Guangdong (CN); Woosung Son, Guangdong (CN)

(73) Assignee: TCL China Star Optoelectronics Technology Co., Ltd., Shenzhen (CN)

(*) Notice: Subject to any disclaimer, the term of this patent is extended or adjusted under 35 U.S.C. 154(b) by 0 days.

(21) Appl. No.: 17/600,118

(22) PCT Filed: Sep. 7, 2021

(86) PCT No.: PCT/CN2021/116989
§ 371 (c)(1),
(2) Date: Sep. 30, 2021

(87) PCT Pub. No.: WO2023/015646
PCT Pub. Date: Feb. 16, 2023

(65) Prior Publication Data
US 2024/0027860 A1    Jan. 25, 2024

(30) Foreign Application Priority Data
Aug. 9, 2021   (CN) .......................... 202110907228.9

(51) Int. Cl.
*G02F 1/1368*   (2006.01)
*G02F 1/1362*   (2006.01)

(52) U.S. Cl.
CPC ...... *G02F 1/1368* (2013.01); *G02F 1/136222* (2021.01); *G02F 1/136227* (2013.01); *G02F 1/136286* (2013.01)

(58) Field of Classification Search
None
See application file for complete search history.

(56) References Cited

U.S. PATENT DOCUMENTS

| | | | |
|---|---|---|---|
| 2014/0306216 A1* | 10/2014 | Kim | G02F 1/136227 257/43 |
| 2015/0022766 A1* | 1/2015 | Kim | G02F 1/136209 349/110 |
| 2016/0195790 A1 | 7/2016 | Park et al. | |

(Continued)

FOREIGN PATENT DOCUMENTS

| | | |
|---|---|---|
| CN | 1622708 | 6/2005 |
| CN | 104360557 | 2/2015 |

(Continued)

*Primary Examiner* — Shan Liu

(57) ABSTRACT

The present disclosure provides a display panel and a display panel manufacturing method. The display panel includes a drive circuit layer, a color photoresist layer disposed on the drive circuit layer, a common electrode layer disposed on the color photoresist layer, and a pixel electrode layer disposed on the common electrode layer. The drive circuit layer is provided with a common wire, the common electrode layer is provided with a transparent electrode, the transparent electrode is electrically connected to the common wire, and the pixel electrode layer is provided with a plurality of pixel electrodes.

18 Claims, 6 Drawing Sheets

(56) References Cited

U.S. PATENT DOCUMENTS

| | | | |
|---|---|---|---|
| 2016/0223859 A1* | 8/2016 | Lee | G02F 1/133514 |
| 2016/0223873 A1 | 8/2016 | Shin et al. | |
| 2016/0351588 A1* | 12/2016 | Shu | G02F 1/1368 |
| 2016/0363821 A1 | 12/2016 | Lee et al. | |

FOREIGN PATENT DOCUMENTS

| | | | |
|---|---|---|---|
| CN | 105511173 | | 4/2016 |
| CN | 105511173 A | * | 4/2016 |
| CN | 105793773 | | 7/2016 |
| CN | 205827025 | | 12/2016 |
| CN | 106647055 | | 5/2017 |
| CN | 106847830 | | 6/2017 |
| CN | 107065357 | | 8/2017 |
| CN | 108345153 | | 7/2018 |
| CN | 108776403 | | 11/2018 |
| CN | 208111444 | | 11/2018 |
| CN | 111077709 | | 4/2020 |

* cited by examiner

DISPLAY PANEL AND DISPLAY PANEL MANUFACTURING METHOD

RELATED APPLICATIONS

This application is a National Phase of PCT Patent Application No. PCT/CN2021/116989 having International filing date of Sep. 7, 2021, which claims the benefit of priority Chinese Patent Application No. 202110907228.9 filed on Aug. 9, 2021. The contents of the above applications are all incorporated by reference as if fully set forth herein in their entirety.

FIELD AND BACKGROUND OF THE INVENTION

The present disclosure relates to display technologies, and more particularly, to a display panel and a display panel manufacturing method.

Currently, liquid crystal displays widely adopt frequency conversion display technology, and this technology may resolve a communication problem between a processor and the display well, eliminate the image tearing and fluctuation, and achieve smooth display effect. However, under a low-frequency display mode, a pixel electrode of liquid crystal display has a long period of leakage state. The leakage state eventually leads to the decrease of the voltage of the pixel electrode, which then affects a deflection angle of the liquid crystal and makes the display brightness low. Moreover, there are brightness changes in the process of switching between high and low frequency, which leads to the flickering problem of a displayed picture.

SUMMARY OF THE INVENTION

Pixel electrode leakage is a technical problem in current liquid crystal displays.

The present disclosure provides a display panel and a display panel manufacturing method, to alleviate the technical problem of pixel electrode leakage in current liquid crystal displays.

The present disclosure provides a display panel, including:
 a drive circuit layer, including a common wire;
 a color photoresist layer, disposed on the drive circuit layer and including a plurality of color filters;
 a common electrode layer, disposed on the color photoresist layer and including a transparent electrode, the transparent electrode being electrically connected to the common wire;
 an insulating layer, disposed on the common electrode layer; and
 a pixel electrode layer, disposed on the insulating layer and including a plurality of pixel electrodes.

In the display panel in the present disclosure, orthographic projections of at least some regions of the plurality of pixel electrodes on the common electrode layer is overlapped with at least some regions of the transparent electrode.

In the display panel in the present disclosure, the display panel includes a display region, and the transparent electrode is disposed corresponding to the display region.

In the display panel in the present disclosure, the display panel further includes a first passivation layer disposed between the color photoresist layer and the common electrode layer.

In the display panel in the present disclosure, the display panel further includes a connection electrode, one end of the connection electrode being electrically connected to the transparent electrode by using a via hole on the insulating layer, and another end of the connection electrode being electrically connected to the common wire by using via holes on the first passivation layer and the insulating layer.

In the display panel in the present disclosure, the drive circuit layer includes: a gate, a gate insulating layer disposed on the gate, a semiconductor layer disposed on the gate insulating layer, source and drain electrodes disposed on the semiconductor layer, and a second passivation layer disposed on the source and drain electrodes.

In the display panel in the present disclosure, the gate and the common wire are disposed on the same layer, and the pixel electrode is electrically connected to one of the source and drain electrodes.

In the display panel in the present disclosure, the transparent electrode is electrically connected to the common wire by using a gap between neighboring color filters and via holes on the second passivation layer and the gate insulating layer.

In the display panel in the present disclosure, the display panel further includes a plurality of scanning lines, a plurality of data lines, and a plurality of thin film transistors.

In the display panel in the present disclosure, the color filters include a red filter, a green filter, a blue filter, and a white filter.

In the display panel in the present disclosure, the transparent electrode includes an indium tin oxide electrode.

In the display panel in the present disclosure, the display panel further includes a liquid crystal layer disposed on the pixel electrode layer and an opposite substrate disposed on the liquid crystal layer.

The present disclosure further provides a display panel manufacturing method, including:
 preparing a drive circuit layer including a common wire;
 preparing a color photoresist layer including a plurality of color filters on the drive circuit layer;
 preparing a common electrode layer including a transparent electrode on the color photoresist layer, the transparent electrode being electrically connected to the common wire;
 preparing an insulating layer on the common electrode layer; and
 preparing a pixel electrode layer including a plurality of pixel electrodes on the insulating layer.

In the display panel manufacturing method in the present disclosure, the step of preparing a common electrode layer including a transparent electrode on the color photoresist layer further includes:
 preparing a first passivation layer on the color photoresist layer, preparing the common electrode layer on the first passivation layer, and patterning the common electrode layer to form the transparent electrode.

In the display panel manufacturing method in the present disclosure, after the step of preparing an insulating layer on the common electrode layer, the method further includes:
 forming via holes on the insulating layer, the first passivation layer, and the color photoresist layer, so that some regions of the transparent electrode and some regions of the common wire are exposed by using the via holes on the insulating layer, the first passivation layer, and the color photoresist layer, and so that one of source and drain electrodes is exposed by using the via holes on the insulating layer, the first passivation layer, and the color photoresist layer.

In the display panel manufacturing method in the present disclosure, the step of preparing a pixel electrode layer including a plurality of pixel electrodes on the insulating layer includes:

preparing a pixel electrode layer on the insulating layer, and patterning the pixel electrode layer to form the plurality of pixel electrodes and a connection electrode, one end of the connection electrode being electrically connected to the transparent electrode by using the via hole on the insulating layer, and another end of the connection electrode being electrically connected to the common wire by using the via holes on the first passivation layer and the insulating layer.

In the display panel manufacturing method in the present disclosure, the step of preparing a drive circuit layer including a common wire includes:

preparing the drive circuit layer on a substrate, the drive circuit layer including: a gate and the common wire disposed on the substrate, a gate insulating layer covering the gate and the common wire, a semiconductor layer disposed on the gate insulating layer, source and drain electrodes disposed on the semiconductor layer, and a second passivation layer disposed on the source and drain electrodes.

In the display panel manufacturing method in the present disclosure, the step of preparing a color photoresist layer including a plurality of color filters on the drive circuit layer includes:

preparing the color photoresist layer including a red filter, a green filter, a blue filter, and a white filter on the drive circuit layer.

In the display panel manufacturing method in the present disclosure, the step of preparing a common electrode layer including a transparent electrode on the color photoresist layer includes:

preparing the common electrode layer including an indium tin oxide electrode on the color photoresist layer, the indium tin oxide electrode being electrically connected to the common wire.

The present disclosure further provides a display panel, including:

a drive circuit layer, including: a gate, a gate insulating layer disposed on the gate, a semiconductor layer disposed on the gate insulating layer, source and drain electrodes disposed on the semiconductor layer, a second passivation layer disposed on the source and drain electrodes, and a common wire disposed at same layer as the gate;

a color photoresist layer, disposed on the drive circuit layer and including a plurality of color filters;

a common electrode layer, disposed on the color photoresist layer and including a transparent electrode, wherein the transparent electrode is electrically connected to the common wire by using a gap between neighboring color filters and via holes on the second passivation layer and the gate insulating layer;

an insulating layer, disposed on the common electrode layer; and a pixel electrode layer, disposed on the insulating layer and including a plurality of pixel electrodes.

The present disclosure provides a display panel and a display panel manufacturing method. The display panel includes a drive circuit layer, a color photoresist layer disposed on the drive circuit layer, a common electrode layer disposed on the color photoresist layer, and a pixel electrode layer disposed on the common electrode layer. The drive circuit layer is provided with a common wire, the common electrode layer is provided with a transparent electrode, the transparent electrode is electrically connected to the common wire, and the pixel electrode layer is provided with a plurality of pixel electrodes. In the present disclosure, a transparent electrode is disposed between a color photoresist layer and a pixel electrode layer, so that a storage capacitance is formed between the transparent electrode and a plurality of pixel electrodes, and a voltage state of the pixel electrodes is maintained when a display panel is in a low-frequency display. Therefore, the leakage of the pixel electrodes is effectively alleviated, the display quality of the display panel is improved, and transparent electrode allows light to pass through without adversely affecting the display effect of the display panel.

BRIEF DESCRIPTION OF SEVERAL VIEWS OF THE DRAWINGS

To describe the technical solutions of the embodiments or the existing technology more clearly, the following briefly describes the accompanying drawings required for describing the embodiments or the existing technology. Apparently, the accompanying drawings in the following description show only some embodiments of the present disclosure, and persons skilled in the art may still derive other drawings from these accompanying drawings without creative efforts.

DESCRIPTION OF SPECIFIC EMBODIMENTS OF THE INVENTION

The following description of various embodiments is provided to exemplify the detailed embodiments of the present disclosure with reference to accompanying drawings. The directional terms mentioned in the present disclosure, such as "above", "below", "front", "back", "left", "right", "inner", "outer", and "side surface" refer to the directions in the accompanying drawings. Therefore, the directional terms are only used for illustration and understanding instead of limiting the present disclosure. In the accompanying drawings, units with similar structures are represented by using the same labels.

Embodiments of the present disclosure provide a display panel and a display panel manufacturing method. The display panel includes a drive circuit layer, a color photoresist layer disposed on the drive circuit layer, a common electrode layer disposed on the color photoresist layer, and a pixel electrode layer disposed on the common electrode layer. The drive circuit layer is provided with a common wire, the common electrode layer is provided with a transparent electrode, the transparent electrode is electrically connected to the common wire, and the pixel electrode layer is provided with a plurality of pixel electrodes. In the embodiments of the present disclosure, a transparent electrode is disposed between a color photoresist layer and a pixel electrode layer, so that a storage capacitance is formed between the transparent electrode and a plurality of pixel electrodes, and a voltage state of the pixel electrodes is maintained when a display panel is in a low-frequency display. Therefore, the leakage of the pixel electrodes is effectively alleviated, the display quality of the display panel is improved, and transparent electrode allows light to pass through without adversely affecting the display effect of the display panel.

The display panel provided in the present disclosure is described below by using detailed embodiments.

Figure 1:
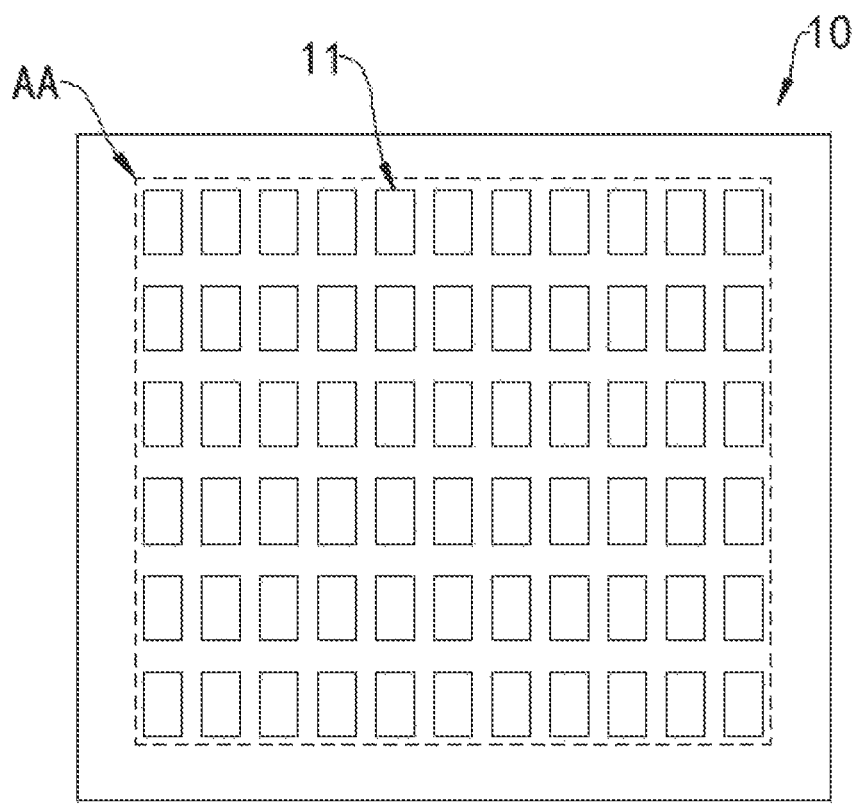
FIG. 1 is a schematic diagram of a structure of a display panel according to an embodiment of the present disclosure.
Figure 2:
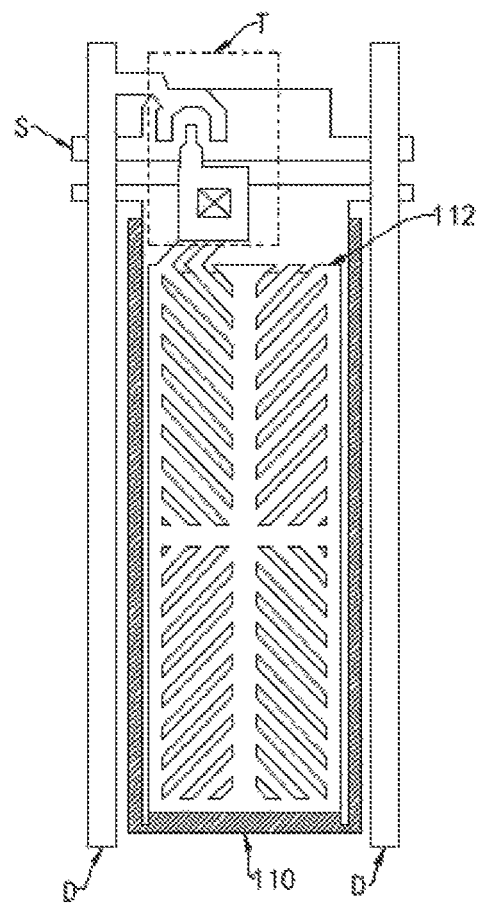
FIG. 2 is a schematic diagram of a structure of a pixel unit in a display panel according to an embodiment of the present disclosure.

Referring to FIG. 1 and FIG. 2, FIG. 1 is a schematic diagram of a structure of a display panel according to an embodiment of the present disclosure. FIG. 2 is a schematic diagram of a structure of a pixel unit in a display panel according to an embodiment of the present disclosure.

An embodiment of the present disclosure provides a display panel 10. The display panel 10 includes a display region AA, and the display panel 10 is provided with a plurality of pixel units 11 at a region corresponding to the display region AA. Each of the pixel units 11 is correspondingly provided with a drive circuit, a color filter, a pixel electrode, and the like. The pixel unit 11 is a basic repeating unit on the display panel 10.

The display panel 10 includes a plurality of scanning lines S, a plurality of data lines D, and a plurality of thin film transistors T. The scanning line S is configured to provide a scanning signal, to control an on/off state of the thin film transistor T. The data line D is configured to provide a data signal and transmit the data signal to the thin film transistor T. The thin film transistor T further transmits the data signal to pixel electrodes 112 under control of the scanning signal.

Figure 3:
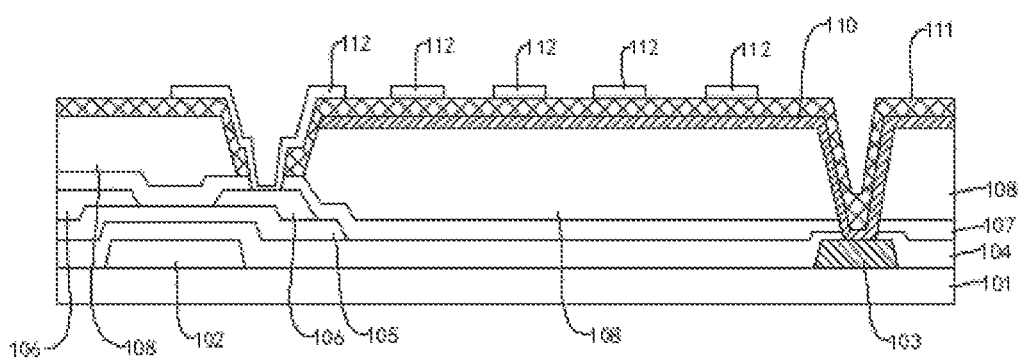
FIG. 3 is a schematic diagram of a local film layer structure of a first display panel according to an embodiment of the present disclosure.

Further referring to FIG. 3, FIG. 3 is a schematic diagram of a local film layer structure of a first display panel according to an embodiment of the present disclosure. The display panel 10 includes a substrate 101, a drive circuit layer disposed on the substrate 101, a color photoresist layer disposed on the drive circuit layer, a common electrode layer disposed on the color photoresist layer, an insulating layer 111 disposed on the common electrode layer, and a pixel electrode layer disposed on the insulating layer 111.

The substrate 101 may include a substrate layer and a buffer layer located on the substrate layer. The substrate layer may be made of one or more of materials, such as glass and polyimide. The buffer layer includes a buffer material, such as polyimide and the like. The buffer layer is configured to relieve the stress mismatch between the substrate layer and film layers above the substrate layer.

The drive circuit layer includes: a gate 102 and a common wire 103 disposed on the substrate 101, a gate insulating layer 104 covering the gate 102 and the common wire 103, a semiconductor layer 105 disposed on the gate insulating layer 104, source and drain electrodes 106 disposed on the semiconductor layer 105, and a second passivation layer 107 disposed on the source and drain electrodes 106. The gate 102 is electrically connected to the scanning line S, and receives a scanning signal provided by the scanning line S. The common wire 103 is electrically connected to a constant voltage supply end, and is configured to transmit a constant voltage signal provided by the constant voltage supply end. The semiconductor layer 105 may include a low temperature polysilicon semiconductor or a metal-oxide semiconductor, and two opposite ends of the semiconductor layer 105 form a source doped region and a drain doped region. The source and drain electrodes 106 include a source and a drain. The source is disposed corresponding to the source doped region of the semiconductor layer 105, and the drain is disposed corresponding to the drain doped region of the semiconductor layer 105. Both the gate insulating layer 104 and the second passivation layer 107 are made of an inorganic insulating material. The gate 102, the semiconductor layer 105, and the source and drain electrodes 106 form the thin film transistor T.

The color photoresist layer includes a plurality of color filters 108 disposed on the second passivation layer 107, and each color filter 108 corresponds to one pixel unit 11. Optionally, the plurality of color filters 108 include a red filter, a green filter, a blue filter, and a white filter.

The common electrode layer includes a transparent electrode 110 disposed on the color filters 108, the transparent electrode 110 is electrically connected to the common wire 103, and the common wire 103 provides a constant voltage signal to the transparent electrode 110.

Described in detail, the transparent electrode 110 is electrically connected to the common wire 103 by using a gap between neighboring color filters 108 and via holes on the second passivation layer 107 and the gate insulating layer 104. The transparent electrode 110 is disposed corresponding to the display region AA of the display panel 10, and covers at least one pixel unit 11.

Optionally, the transparent electrode 110 may be selected from transparent electrodes, such as an indium tin oxide electrode, so that the transparent electrode 110 is light transmittable. In the present embodiment, the transparent electrode 110 of the common electrode layer is set to be light transmittable, so that the transparent electrode 110 in the display region AA of the display panel 10 does not adversely affect light passing through inside the display panel 10

The insulating layer 111 covers the transparent electrode 110 and the color filters 108, and the insulating layer 111 may be made of inorganic insulating materials, such as silicon nitride and silicon oxide.

The pixel electrode layer includes a plurality of pixel electrodes 112, and the plurality of pixel electrodes 112 are disposed on the insulating layer 111 and are electrically insulated from the transparent electrode 110. The plurality of pixel electrodes 112 are electrically connected to the source and drain electrodes 106 by using via holes on the insulating layer 111 and the second passivation layer 107, to receive a data signal transmitted by the data line D through the thin film transistor T.

Further, orthographic projections of at least some regions of the plurality of pixel electrodes 112 on the common electrode layer is overlapped with at least some regions of the transparent electrode 110. The plurality of pixel electrodes 112 and the transparent electrode 110 form a storage capacitance. Because the transparent electrode 110 has a constant voltage, when the pixel electrodes 112 are charged, the storage capacitance stores partial capacity, so as to maintain a voltage state of the pixel electrodes 112, to prevent the display panel 10 from low voltage due to leakage of the pixel electrodes 112 in low frequency display mode, further to alleviate a flashing problem of the display panel 10 when switching between high and low frequencies, which helps to improve the display quality of the display panel 10.

The plurality of pixel electrodes 112 are disposed corresponding to the display region of the display panel 10, the display panel 10 includes the plurality of pixel electrodes 112, and each of the plurality of pixel electrodes 112 is disposed corresponding to one pixel unit 11. Optionally, the pixel electrodes 112 are indium tin oxide electrodes.

Figure 4:
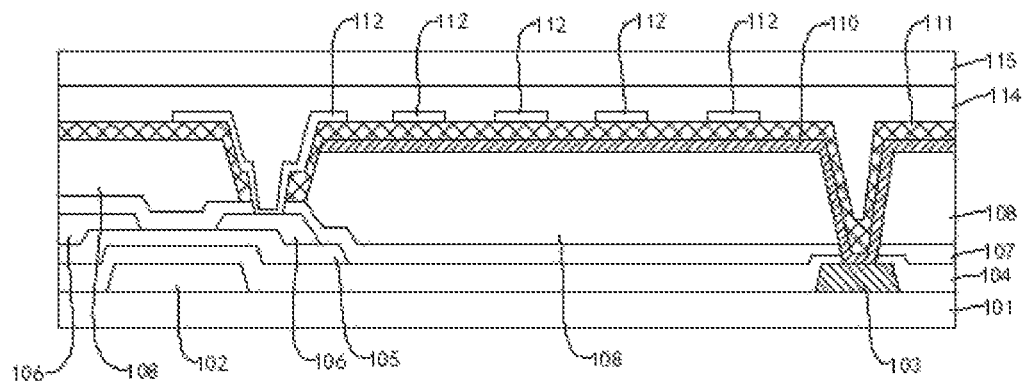
FIG. 4 is a schematic diagram of a film layer structure of a first display panel including an opposite substrate and a liquid crystal layer according to an embodiment of the present disclosure.

Further referring to FIG. 4, FIG. 4 is a schematic diagram of a film layer structure of a first display panel including an opposite substrate and a liquid crystal layer according to an embodiment of the present disclosure. The display panel 10 further includes a liquid crystal layer 114 disposed on the pixel electrodes 112 and an opposite substrate 115 disposed on the liquid crystal layer 114. The liquid crystal layer 114 is provided with a liquid crystal, the opposite substrate 115 is provided with an opposite electrode, and the opposite electrode has a constant voltage. The liquid crystal produces a specific angle deflection under the action of the electric field formed by the pixel electrodes 112 and the opposite electrode, so that the display panel 10 presents a variety of display gray scales.

Optionally, the opposite electrode is disposed on a side of the opposite substrate 115 near the liquid crystal layer 114. There may alternatively be a layer of insulating materials between the pixel electrodes 112 and the liquid crystal layer 114, to keep an electrical insulation between the pixel electrodes 112 and the liquid crystal.

Figure 5:
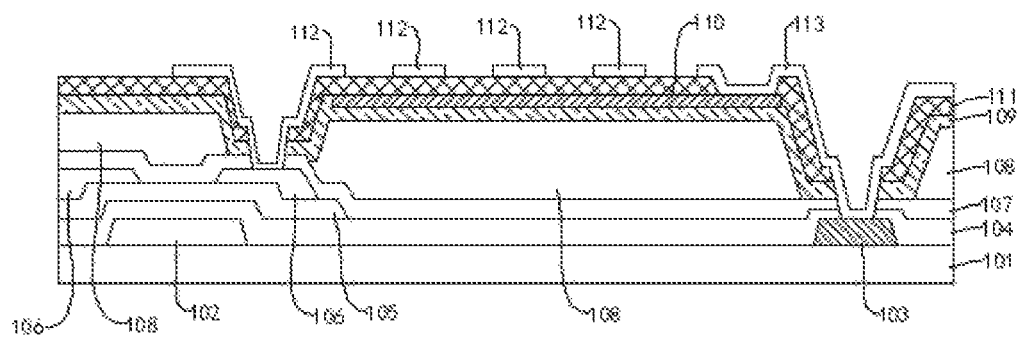
FIG. 5 is a schematic diagram of a local film layer structure of a second display panel according to an embodiment of the present disclosure.

In another embodiment, referring to FIG. 1, FIG. 2, and FIG. 5. FIG. 5 is a schematic diagram of a local film layer structure of a second display panel according to an embodiment of the present disclosure. It should be noted that, the display panel provided in the present embodiment and the display panel provided in the above embodiment has the same or similar structures. Structural features of the display panel provided in the present embodiment are described in the following, and for details not described herein, reference is made to the above embodiments.

The display panel 10 includes a substrate 101, a drive circuit layer disposed on the substrate 101, a color photoresist layer disposed on the drive circuit layer, a first passivation layer 109 disposed on the color photoresist layer, a common electrode layer disposed on the first passivation layer 109, an insulating layer 111 disposed on the common electrode layer, and a pixel electrode layer disposed on the insulating layer 111.

The drive circuit layer includes: a gate 102 and a common wire 103 disposed on the substrate 101, a gate insulating layer 104 covering the gate 102 and the common wire 103, a semiconductor layer 105 disposed on the gate insulating layer 104, source and drain electrodes 106 disposed on the semiconductor layer 105, and a second passivation layer 107 disposed on the source and drain electrodes 106. The gate 102 is electrically connected to the scanning line S, and receives a scanning signal provided by the scanning line S. The common wire 103 is electrically connected to a constant voltage supply end, and is configured to transmit a constant voltage signal provided by the constant voltage supply end. Two opposite ends of the semiconductor layer 105 form a source doped region and a drain doped region. The source and drain electrodes 106 include a source and a drain. The source is disposed corresponding to the source doped region of the semiconductor layer 105, and the drain is disposed corresponding to the drain doped region of the semiconductor layer 105. Both the gate insulating layer 104 and the second passivation layer 107 are made of an inorganic insulating material. The gate 102, the semiconductor layer 105, and the source and drain electrodes 106 form the thin film transistor T.

The color photoresist layer includes a plurality of color filters 108 disposed on the second passivation layer 107, and each color filter 108 corresponds to one pixel unit 11. Optionally, the plurality of color filters 108 include a red filter, a green filter, a blue filter, and a white filter.

The first passivation layer 109 covers a plurality of color filters 108 in the color photoresist layer, and the first passivation layer 109 may be made of an inorganic insulating material.

The common electrode layer includes a transparent electrode 110 disposed on the first passivation layer 109, the transparent electrode 110 is electrically connected to the common wire 103, and the common wire 103 provides a constant voltage signal to the transparent electrode 110.

Described in detail, the display panel further includes a connection electrode 113, and the transparent electrode 110 is electrically connected to the common wire 103 by using the connection electrode 113.

Further, one end of the connection electrode 113 is electrically connected to the transparent electrode 110 by using a via hole on the insulating layer 111, and another end of the connection electrode 113 is electrically connected to the common wire 103 by using via holes on the gate insulating layer 104, the first passivation layer 109, and the insulating layer 111, so as to form an electric connection between the transparent electrode 110 and the common wire 103.

The transparent electrode 110 is disposed corresponding to the display region AA of the display panel 10, and covers at least one pixel unit 11. Optionally, the transparent electrode 110 may be selected from transparent electrodes, such as an indium tin oxide electrode, so that the transparent electrode 110 is light transmittable.

In the present embodiment, the transparent electrode 110 of the common electrode layer is set to be light transmittable, so that the transparent electrode 110 in the display region AA of the display panel 10 does not adversely affect light passing through inside the display panel 10

The pixel electrode layer includes a plurality of pixel electrodes 112, and the plurality of pixel electrodes 112 are disposed on the insulating layer 111 and are electrically insulated from the transparent electrode 110. The plurality of pixel electrodes 112 are electrically connected to the source and drain electrodes 106 by using via holes on the insulating layer 111, the first passivation layer 109, and the second passivation layer 107, to receive a data signal transmitted by the data line D through the thin film transistor T.

Further, orthographic projections of at least some regions of the plurality of pixel electrodes 112 on the common electrode layer is overlapped with at least some regions of the transparent electrode 110. The plurality of pixel electrodes 112 and the transparent electrode 110 form a storage capacitance. Because the transparent electrode 110 has a constant voltage, when the pixel electrodes 112 are charged, the storage capacitance stores partial capacity, so as to maintain a voltage state of the pixel electrodes 112, to prevent the display panel 10 from low voltage due to leakage of the pixel electrodes 112 in low frequency display mode, further to alleviate a flashing problem of the display panel 10 when switching between high and low frequencies, which helps to improve the display quality of the display panel 10.

The plurality of pixel electrodes 112 are disposed corresponding to the display region of the display panel 10, the display panel 10 includes the plurality of pixel electrodes 112, and each of the plurality of pixel electrodes 112 is disposed corresponding to one pixel unit 11. Optionally, the pixel electrodes 112 are indium tin oxide electrodes.

Figure 6:
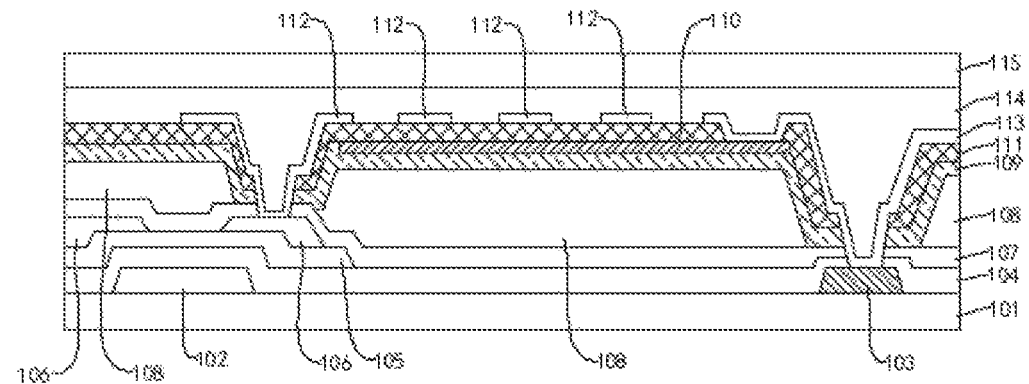
FIG. 6 is a schematic diagram of a film layer structure of a second display panel including an opposite substrate and a liquid crystal layer according to an embodiment of the present disclosure.
Figure 7:
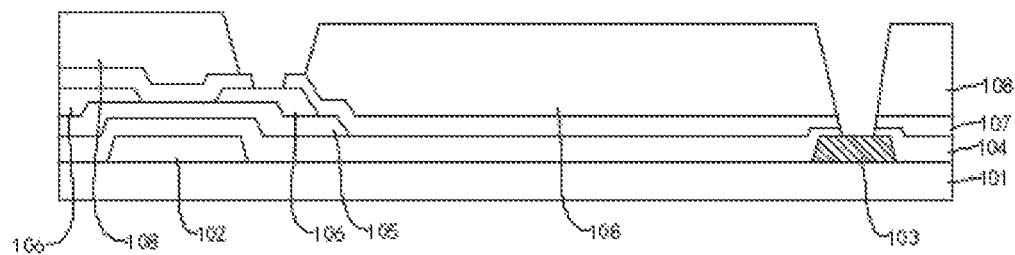
FIG. 7 is a schematic diagram of a structure after a color photoresist layer is produced by using a first display panel manufacturing method according to an embodiment of the present disclosure.
Figure 8:
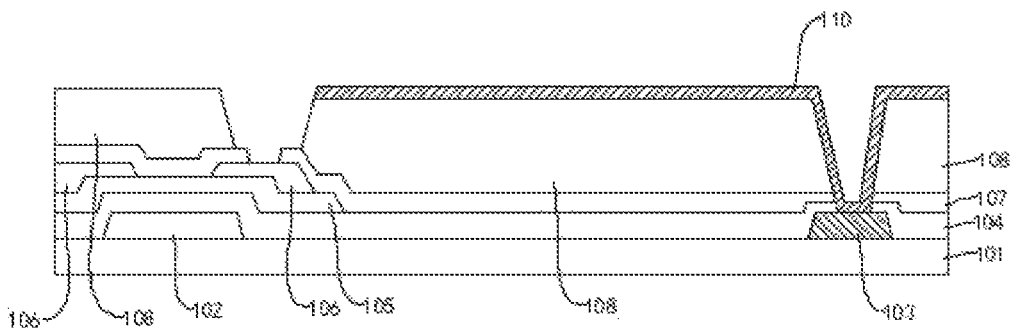
FIG. 8 is a schematic diagram of a structure after a common electrode layer is produced by using a first display panel manufacturing method according to an embodiment of the present disclosure.
Figure 9:
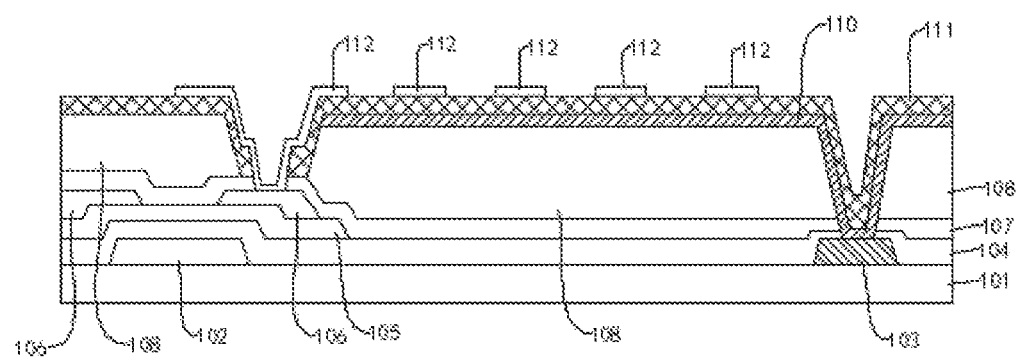
FIG. 9 is a schematic diagram of a structure after a pixel electrode layer is produced by using a first display panel manufacturing method according to an embodiment of the present disclosure.
Figure 10:
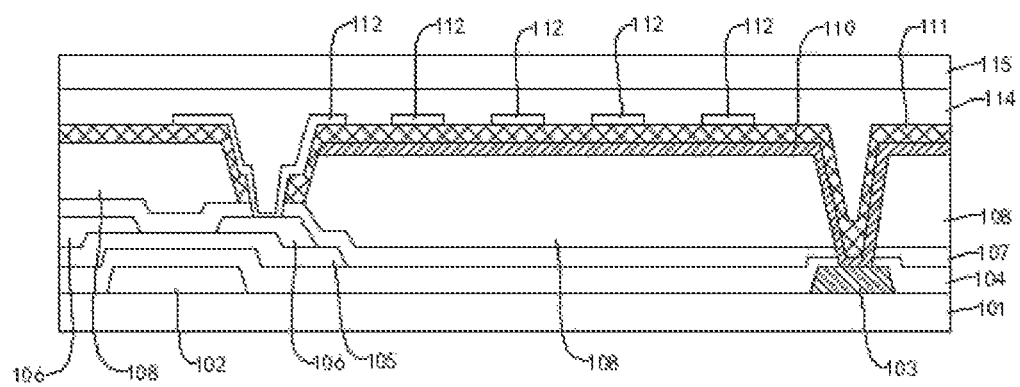
FIG. 10 is a schematic diagram of a structure after a first display panel manufacturing method is performed according to an embodiment of the present disclosure.
Figure 11:
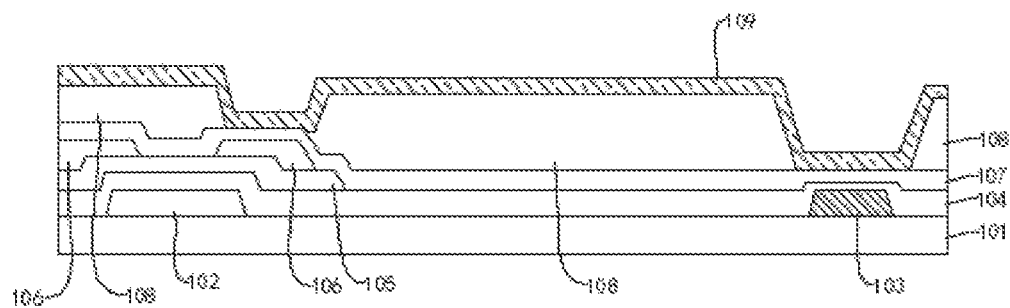
FIG. 11 is a schematic diagram of a structure after a first passivation layer is produced by using a second display panel manufacturing method according to an embodiment of the present disclosure.
Figure 12:
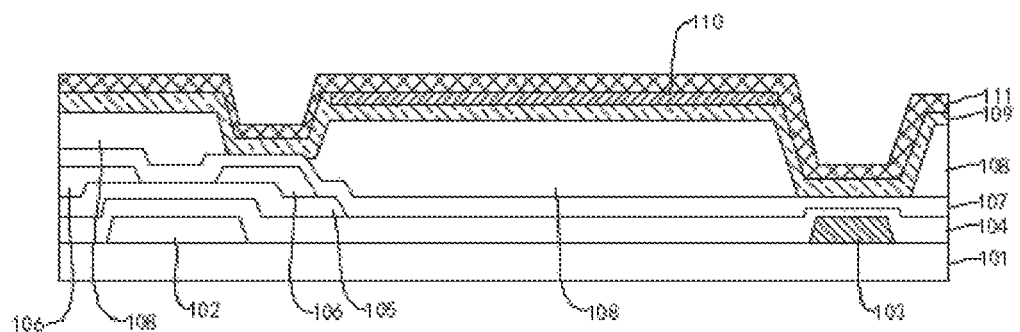
FIG. 12 is a schematic diagram of a structure after an insulating layer is produced by using a second display panel manufacturing method according to an embodiment of the present disclosure.
Figure 13:
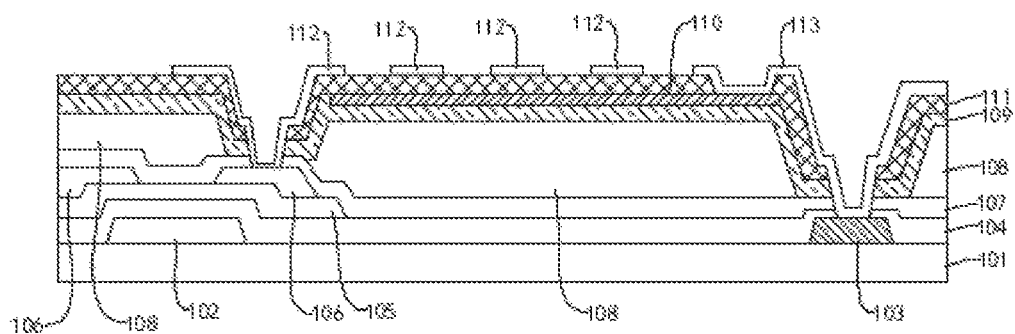
FIG. 13 is a schematic diagram of a structure after a pixel electrode layer is produced by using a second display panel manufacturing method according to an embodiment of the present disclosure.
Figure 14:
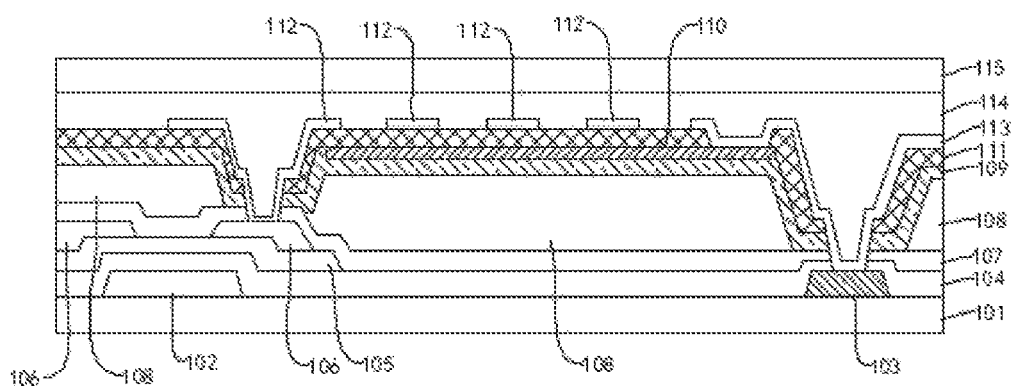
FIG. 14 is a schematic diagram of a structure after a first display panel manufacturing method is performed according to an embodiment of the present disclosure.

Further referring to FIG. 6, FIG. 6 is a schematic diagram of a film layer structure of a second display panel including an opposite substrate and a liquid crystal layer according to an embodiment of the present disclosure. The display panel 10 further includes a liquid crystal layer 114 disposed on the pixel electrodes 112 and an opposite substrate 115 disposed on the liquid crystal layer 114. The liquid crystal layer 114 is provided with a liquid crystal, the opposite substrate 115 is provided with an opposite electrode, and the opposite electrode has a constant voltage. The liquid crystal produces a specific angle deflection under the action of the electric field formed by the pixel electrodes 112 and the opposite electrode, so that the display panel 10 presents a variety of display gray scales.

Optionally, the opposite electrode is disposed on a side of the opposite substrate 115 near the liquid crystal layer 114. There may alternatively be a layer of insulating materials between the pixel electrodes 112 and the liquid crystal layer 114, to keep an electrical insulation between the pixel electrodes 112 and the liquid crystal.

In conclusion, the display panel provided in the embodiments of the present disclosure includes a drive circuit layer, a color photoresist layer disposed on the drive circuit layer, a common electrode layer disposed on the color photoresist layer, and a pixel electrode layer disposed on the common electrode layer. The drive circuit layer is provided with a common wire, the common electrode layer is provided with a transparent electrode, the transparent electrode is electrically connected to the common wire, and the pixel electrode layer is provided with a plurality of pixel electrodes. In the embodiments of the present disclosure, a transparent electrode is disposed between a color photoresist layer and a pixel electrode layer, so that a storage capacitance is formed between the transparent electrode and a plurality of pixel electrodes, and a voltage state of the pixel electrodes is maintained when a display panel is in a low-frequency display. Therefore, the leakage of the pixel electrodes is effectively alleviated, the display quality of the display panel is improved, and transparent electrode allows light to pass through without adversely affecting the display effect of the display panel.

Another embodiment of the present disclosure further provides a display panel manufacturing method. The display panel manufacturing method includes steps of forming a transparent electrode on a color photoresist layer of a display panel and causing the transparent electrode and pixel electrodes to form a storage capacitance. The method may alleviate a leakage problem of pixel electrodes of a prepared display panel, and the process is simple and easy to implement.

The display panel manufacturing method provided in the present disclosure is described below by using detailed embodiments.

In an embodiment, referring to FIGS. 7 to 10, the display panel manufacturing method includes the following steps:

Step S101: Prepare a drive circuit layer including a common wire 103. Described in detail, the drive circuit layer is prepared on a substrate 101. The drive circuit layer includes: a gate 102 and the common wire 103 disposed on the substrate 101, a gate insulating layer 104 covering the gate 102 and the common wire 103, a semiconductor layer 105 disposed on the gate insulating layer 104, source and drain electrodes 106 disposed on the semiconductor layer 105, and a second passivation layer 107 disposed on the source and drain electrodes 106. The common wire 103 is electrically connected to a constant voltage supply end, and is configured to transmit a constant voltage signal provided by the constant voltage supply end.

Step S102: Prepare a color photoresist layer including a plurality of color filters 108 on the drive circuit layer. Described in detail, the plurality of color filters 108 in the color photoresist layer are formed by using processes of coating and patterning. The plurality of color filters 108 may include a red filter, a green filter, a blue filter, and a white filter.

Step S103: Prepare a common electrode layer including a transparent electrode 110 on the color photoresist layer, and the transparent electrode 110 is electrically connected to the common wire 103.

Described in detail, the step S103 further includes: forming via holes on the second passivation layer 107, the gate insulating layer 104, and the color photoresist layer through an etching process. The transparent electrode 110 may be prepared by using a physical vapor deposition method. During preparing the transparent electrode 110, the formed transparent electrode 110 is electrically connected to the common wire 103 by using the via holes on the second passivation layer 107, the gate insulating layer 104, and the color photoresist layer.

Optionally, the transparent electrode 110 may be selected from transparent electrodes, such as an indium tin oxide electrode, so that the transparent electrode 110 is light transmittable.

Step S104: Prepare an insulating layer 111 on the common electrode layer. Described in detail, the insulating layer 111 may be a silicon nitride or silicon oxide film formed by using a vapor deposition process. The insulating layer 111 covers the transparent electrode 110 and the color filters 108.

After the step S104, the display panel manufacturing method further includes: forming via holes on the insulating layer 111, the second passivation layer 107, and the color photoresist layer through processes, such as exposing, developing, and etching, so that one of the source and drain electrodes 106 is exposed by using the via holes on the insulating layer 111, the second passivation layer 107, and the color photoresist layer.

Step S105: Prepare a pixel electrode layer including a plurality of pixel electrodes 112 on the insulating layer 111. Described in detail, the plurality of pixel electrodes 112 may be an indium tin oxide film formed through a patterning and deposition process, or may be an indium tin oxide film formed by patterning the prepared pixel electrode layer. Moreover, the plurality of formed pixel electrodes 112 are electrically connected to the source and drain electrodes 106 by using via holes on the insulating layer 111 and the second passivation layer 107.

Further, the display panel manufacturing method further includes: preparing a liquid crystal layer 114 including a liquid crystal on the pixel electrode layer; and disposing an opposite substrate 115 on a side of the liquid crystal layer 114 away from the pixel electrode layer, the opposite substrate 115 including an opposite electrode. The liquid crystal produces a specific angle deflection under the action of the electric field formed by the pixel electrodes 112 and the opposite electrode, so that the display panel presents a variety of display gray scales.

Optionally, the display panel manufacturing method further includes: preparing a layer of insulating materials on the pixel electrodes 112 to ensure the pixel electrodes 112 to be electrically insulated from a liquid crystal prepared subsequently.

In another embodiment, referring to FIGS. 11 to 14, the display panel manufacturing method includes the following steps:

Step S101: Prepare a drive circuit layer including a common wire 103. Described in detail, the drive circuit layer is prepared on the substrate 101. The drive circuit layer includes: a gate 102 and the common wire 103 disposed on the substrate 101, a gate insulating layer 104 covering the gate 102 and the common wire 103, a semiconductor layer 105 disposed on the gate insulating layer 104, source and drain electrodes 106 disposed on the semiconductor layer 105, and a second passivation layer 107 disposed on the source and drain electrodes 106. The common wire 103 is electrically connected to a constant voltage supply end, and is configured to transmit a constant voltage signal provided by the constant voltage supply end.

Step S102: Prepare a color photoresist layer including a plurality of color filters 108 on the drive circuit layer. Described in detail, the plurality of color filters 108 in the color photoresist layer are formed by using processes of coating and patterning. The plurality of color filters 108 may include a red filter, a green filter, a blue filter, and a white filter.

Further, the step S102 further includes: preparing a first passivation layer 109 on the color photoresist layer, so that the first passivation layer 109 covers a plurality of color filters 108 in the color photoresist layer. The first passivation layer 109 may be an inorganic insulating layer formed by using a vapor deposition process.

Step S103: Prepare a common electrode layer including a transparent electrode 110 on the first passivation layer 109. Described in detail, the transparent electrode 110 may be prepared through a patterning and deposition process.

Optionally, the transparent electrode 110 may be selected from transparent electrodes, such as an indium tin oxide electrode, so that the transparent electrode 110 is light transmittable.

Step S104: Prepare an insulating layer 111 on the common electrode layer.

Optionally, the insulating layer 111 may be a silicon nitride or silicon oxide film formed by using a vapor deposition process. The insulating layer 111 covers the transparent electrode 110.

Further, after the step S104, the method further includes:
forming via holes on the insulating layer 111, the first passivation layer 109, the second passivation layer 107, and the color photoresist layer through processes, such as exposing, developing, and etching, so that the source and drain electrodes 106 are exposed by using the via holes on the insulating layer 111, the first passivation layer 109, the second passivation layer 107, and the color photoresist layer; forming a via hole on the insulating layer 111, so that the transparent electrode 110 is exposed by using the via hole on the insulating layer 111; and forming via holes on the insulating layer 111, the first passivation layer 109, the second passivation layer 107, the gate insulating layer 104, and the color photoresist layer, so that the common wire 103 is exposed by using the via holes on the insulating layer 111, the first passivation layer 109, the second passivation layer 107, the gate insulating layer 104, and the color photoresist layer. The above via holes may be prepared by using the same process.

Step S105: Prepare a pixel electrode layer including a plurality of pixel electrodes 112 on the insulating layer 111.

Described in detail, the step S105 includes: preparing the plurality of pixel electrodes 112 and a connection electrode 113 on the insulating layer 111, so that one end of the connection electrode 113 is electrically connected to the transparent electrode 110 by using the via hole on the insulating layer 111, and another end of the connection electrode 113 is electrically connected to the common wire 103 by using the via holes on the insulating layer 111, the first passivation layer 109, the second passivation layer 107, and the gate insulating layer 104.

The plurality of pixel electrodes 112 and the connection electrode 113 may be an indium tin oxide film formed through a patterning and deposition process, or may be an indium tin oxide film formed by patterning the prepared pixel electrode layer. Moreover, the plurality of formed pixel electrodes 112 are electrically connected to the source and drain electrodes 106 by using via holes on the insulating layer 111, the first passivation layer 109, and the second passivation layer 107.

Further, the display panel manufacturing method further includes: preparing a liquid crystal layer 114 including a liquid crystal on the pixel electrode layer; and disposing an opposite substrate 115 on a side of the liquid crystal layer 114 away from the pixel electrode layer, the opposite substrate 115 including an opposite electrode. The liquid crystal produces a specific angle deflection under the action of the electric field formed by the pixel electrodes 112 and the opposite electrode, so that the display panel presents a variety of display gray scales.

Optionally, the display panel manufacturing method further includes: preparing a layer of insulating materials on the pixel electrodes 112 to ensure the pixel electrodes 112 to be electrically insulated from a liquid crystal prepared subsequently.

In conclusion, the display panel manufacturing method provided in the embodiments of the present disclosure includes steps of forming a transparent electrode on a color photoresist layer of a display panel and causing the transparent electrode and pixel electrodes to form a storage capacitance. The method may alleviate a leakage problem of pixel electrodes of a prepared display panel, and the process is simple and easy to implement.

It should be noted that, although the present disclosure has been disclosed with reference to the above embodiments, the embodiments are not intended to limit the present disclosure. A person of ordinary skill in the art may make some variations and improvements without departing from the spirit and scope of the present disclosure. Therefore, the protection scope of the present disclosure should be subject to the appended claims.

What is claimed is:

1. A display panel, comprising:
a drive circuit layer, comprising a common wire;
a color photoresist layer, disposed on the drive circuit layer and comprising a plurality of color filters;
a first passivation layer, disposed on the color photoresist layer;
a common electrode layer, disposed on the first passivation layer and comprising a transparent electrode, wherein the transparent electrode is electrically connected to the common wire;
an insulating layer, disposed on the common electrode layer and the first passivation layer; and
a pixel electrode layer, disposed on the insulating layer and comprising a plurality of pixel electrodes,
wherein a top surface of the transparent electrode facing away from the color photoresist layer is flush with a top surface of the first passivation layer furthest from the color photoresist layer, and the first passivation layer wraps a lateral side of the transparent electrode.

2. The display panel as claimed in claim 1, wherein orthographic projections of at least some regions of the plurality of pixel electrodes on the common electrode layer is overlapped with at least some regions of the transparent electrode.

3. The display panel as claimed in claim 1, wherein the display panel comprises a display region, and the transparent electrode is disposed corresponding to the display region.

4. The display panel as claimed in claim 1, wherein the display panel further comprises a connection electrode, one end of the connection electrode is electrically connected to the transparent electrode through a via hole defined on the insulating layer, and another end of the connection electrode is electrically connected to the common wire through a via hole defined on the first passivation layer and the insulating layer.

5. The display panel as claimed in claim 1, wherein the drive circuit layer comprises: a gate, a gate insulating layer disposed on the gate, a semiconductor layer disposed on the gate insulating layer, source and drain electrodes disposed on the semiconductor layer, and a second passivation layer disposed on the source and drain electrodes.

6. The display panel as claimed in claim 5, wherein the gate and the common wire are disposed on a same layer, and the pixel electrode is electrically connected to one of the source and drain electrodes.

7. The display panel as claimed in claim 5, wherein the transparent electrode is electrically connected to the common wire through a gap between two adjacent color filters and a via hole defined on the second passivation layer and the gate insulating layer.

8. The display panel as claimed in claim 1, wherein the display panel further comprises a plurality of scanning lines, a plurality of data lines, and a plurality of thin film transistors.

9. The display panel as claimed in claim 1, wherein the color filters comprise a red filter, a green filter, a blue filter, and a white filter.

10. The display panel as claimed in claim 1, wherein the transparent electrode comprises an indium tin oxide electrode.

11. The display panel as claimed in claim 1, wherein the display panel further comprises a liquid crystal layer disposed on the pixel electrode layer and an opposite substrate disposed on the liquid crystal layer.

12. A display panel manufacturing method, comprising:
providing a drive circuit layer comprising a common wire;
providing a color photoresist layer comprising a plurality of color filters on the drive circuit layer;
providing a first passivation layer on the color photoresist layer;
providing a common electrode layer on the first passivation layer and patterning the common electrode layer to form a transparent electrode, wherein the transparent electrode is electrically connected to the common wire, a top surface of the transparent electrode facing away from the color photoresist layer is flush with a top surface of the first passivation layer furthest from the color photoresist layer, and the first passivation layer wraps a lateral side of the transparent electrode;
providing an insulating layer on the common electrode layer and the first passivation layer; and
providing a pixel electrode layer comprising a plurality of pixel electrodes on the insulating layer.

13. The display panel manufacturing method as claimed in claim 12, wherein after the step of providing the insulating layer on the common electrode layer and the first passivation layer, the method further comprises:
forming via holes on the insulating layer, the first passivation layer, and the color photoresist layer to expose some regions of the transparent electrode and some regions of the common wire through the via holes on the insulating layer, the first passivation layer, and the color photoresist layer, and to expose one of source and drain electrodes through via holes on the insulating layer, the first passivation layer, and the color photoresist layer.

14. The display panel manufacturing method as claimed in claim 13, wherein the step of providing the pixel electrode layer comprising the plurality of pixel electrodes on the insulating layer comprises:
providing the pixel electrode layer on the insulating layer, and patterning the pixel electrode layer to form the plurality of pixel electrodes and a connection electrode, wherein one end of the connection electrode is electrically connected to the transparent electrode through the via hole defined on the insulating layer, and another end of the connection electrode is electrically connected to the common wire through the via hole defined on the first passivation layer and the insulating layer.

15. The display panel manufacturing method as claimed in claim 12, wherein the step of providing the drive circuit layer comprising the common wire comprises:
providing the drive circuit layer on a substrate, wherein the drive circuit layer comprises: a gate and the common wire disposed on the substrate, a gate insulating layer covering the gate and the common wire, a semiconductor layer disposed on the gate insulating layer, source and drain electrodes disposed on the semiconductor layer, and a second passivation layer disposed on the source and drain electrodes.

16. The display panel manufacturing method as claimed in claim 12, wherein the step of providing the color photoresist layer comprising the plurality of color filters on the drive circuit layer comprises:

providing the color photoresist layer comprising a red filter, a green filter, a blue filter, and a white filter on the drive circuit layer.

17. The display panel manufacturing method as claimed in claim 12, wherein the step of providing the common electrode layer on the first passivation layer and patterning the common electrode layer to form the transparent electrode comprises:

providing the common electrode layer comprising an indium tin oxide electrode on the first passivation layer, the indium tin oxide electrode being electrically connected to the common wire.

18. A display panel, comprising:

a drive circuit layer comprising a gate, a gate insulating layer disposed on the gate, a semiconductor layer disposed on the gate insulating layer, source and drain electrodes disposed on the semiconductor layer, a second passivation layer disposed on the source and drain electrodes, and a common wire disposed at a same layer as the gate;

a color photoresist layer disposed on the drive circuit layer and comprising a plurality of color filters;

a first passivation layer disposed on the color photoresist layer;

a common electrode layer disposed on the first passivation layer and comprising a transparent electrode, wherein the transparent electrode is electrically connected to the common wire through a gap between two adjacent color filters and a via hole defined on the second passivation layer and the gate insulating layer;

an insulating layer disposed on the common electrode layer and the first passivation layer; and a pixel electrode layer disposed on the insulating layer and comprising a plurality of pixel electrodes, wherein a top surface of the transparent electrode facing away from the color photoresist layer is flush with a top surface of the first passivation layer furthest from the color photoresist layer, and the first passivation layer wraps a lateral side of the transparent electrode.

* * * * *